(12) United States Patent
Martensson et al.

(10) Patent No.: US 6,349,212 B1
(45) Date of Patent: Feb. 19, 2002

(54) CORDLESS TELEPHONE ARRANGEMENT

(75) Inventors: Nils Erik Vilhelm Martensson, Chobham; Michael Brian Ashdown, High Wycombe, both of (GB)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 08/665,590

(22) Filed: Jun. 18, 1996

Related U.S. Application Data

(63) Continuation of application No. 08/308,950, filed on Sep. 20, 1994, now abandoned, which is a continuation of application No. 08/003,785, filed on Jan. 13, 1993, now abandoned.

(30) Foreign Application Priority Data

Feb. 6, 1992 (GB) .............................. 9202532

(51) Int. Cl.⁷ .................................. H04Q 7/20
(52) U.S. Cl. ...................... 455/462; 455/555; 455/562; 455/564; 455/565
(58) Field of Search .............................. 379/58, 59, 61, 379/63, 67, 88, 355, 60; 455/33.1, 54.1, 89, 462, 555, 564, 565, 562, 426

(56) References Cited

U.S. PATENT DOCUMENTS

| | | | | |
|---|---|---|---|---|
| 4,677,656 A | * | 6/1987 | Burke et al. .................. | 379/63 |
| 4,763,350 A | | 8/1988 | Immendorfer ............... | 379/67 |
| 4,847,818 A | * | 7/1989 | Olsen ........................... | 455/89 |
| 4,870,686 A | | 9/1989 | Gerson et al. ................ | 381/43 |
| 4,878,238 A | * | 10/1989 | Rush et al. ................ | 379/58 X |
| 5,042,063 A | | 8/1991 | Sakanishi et al. ............ | 379/88 |
| 5,095,503 A | * | 3/1992 | Kowalski ...................... | 379/59 |
| 5,140,626 A | * | 8/1992 | Ory et al. ...................... | 379/57 |
| 5,148,471 A | * | 9/1992 | Metroka et al. .............. | 379/58 |
| 5,165,095 A | * | 11/1992 | Borcherding ................. | 379/88 |
| 5,166,971 A | * | 11/1992 | Vollert ........................... | 379/88 |
| 5,203,099 A | * | 4/1993 | Bogusz et al. .............. | 455/33.1 |
| 5,222,121 A | * | 6/1993 | Shimada ....................... | 379/88 |
| 5,222,123 A | * | 6/1993 | Brown et al. .................. | 379/57 |
| 5,265,150 A | * | 11/1993 | Helmkamp et al. ........... | 379/59 |
| 5,297,183 A | * | 3/1994 | Bareis et al. ................. | 379/60 |
| 5,301,359 A | * | 4/1994 | Van der Heuvel et al. | 455/56.1 |
| 5,365,573 A | * | 11/1994 | Sakamoto et al. ............ | 379/61 |
| 5,371,901 A | * | 12/1994 | Reed et al. ................. | 455/11.1 |

FOREIGN PATENT DOCUMENTS

| | | | |
|---|---|---|---|
| EP | 105441 | 4/1984 | |
| EP | 0 180 178 A2 | 5/1986 | |
| GB | 492514 | 9/1938 | |
| GB | 2154393 | 9/1985 | |
| GB | 2229895 | 10/1990 | |
| JP | 63-187847 | * 8/1988 | ................. 379/58 |

* cited by examiner

Primary Examiner—Nay Maung
(74) Attorney, Agent, or Firm—Perman & Green, LLP

(57) ABSTRACT

A cordless telephone arrangement, such as a DECT Business Cordless Telecommunications (BCT) system, comprises a PBX base station (1) and a plurality of mobile stations in the form of portable handsets (2a, 2b . . . 2n). The handsets themselves include no means for independently dialing a telephone number. Instead of a conventional keypad the handsets each comprise only a single "TALK" key 7. The PBX 1 is adapted to dial on behalf of each handset in response to an instruction received by radio communication therefrom. In one embodiment the instructions are delivered orally to the handset. In this case the PBX includes a voice recognition device 12. A voice synthesizer 11 may also be included for returning spoken messages to the handset. The TALK key 7 is used to indicate that the handset is required to make a call, to terminate a call, or to accept an incoming call. Otherwise instructions and messages are largely conveyed between the mobile station and the base station by spoken word using radio communication.

15 Claims, 2 Drawing Sheets

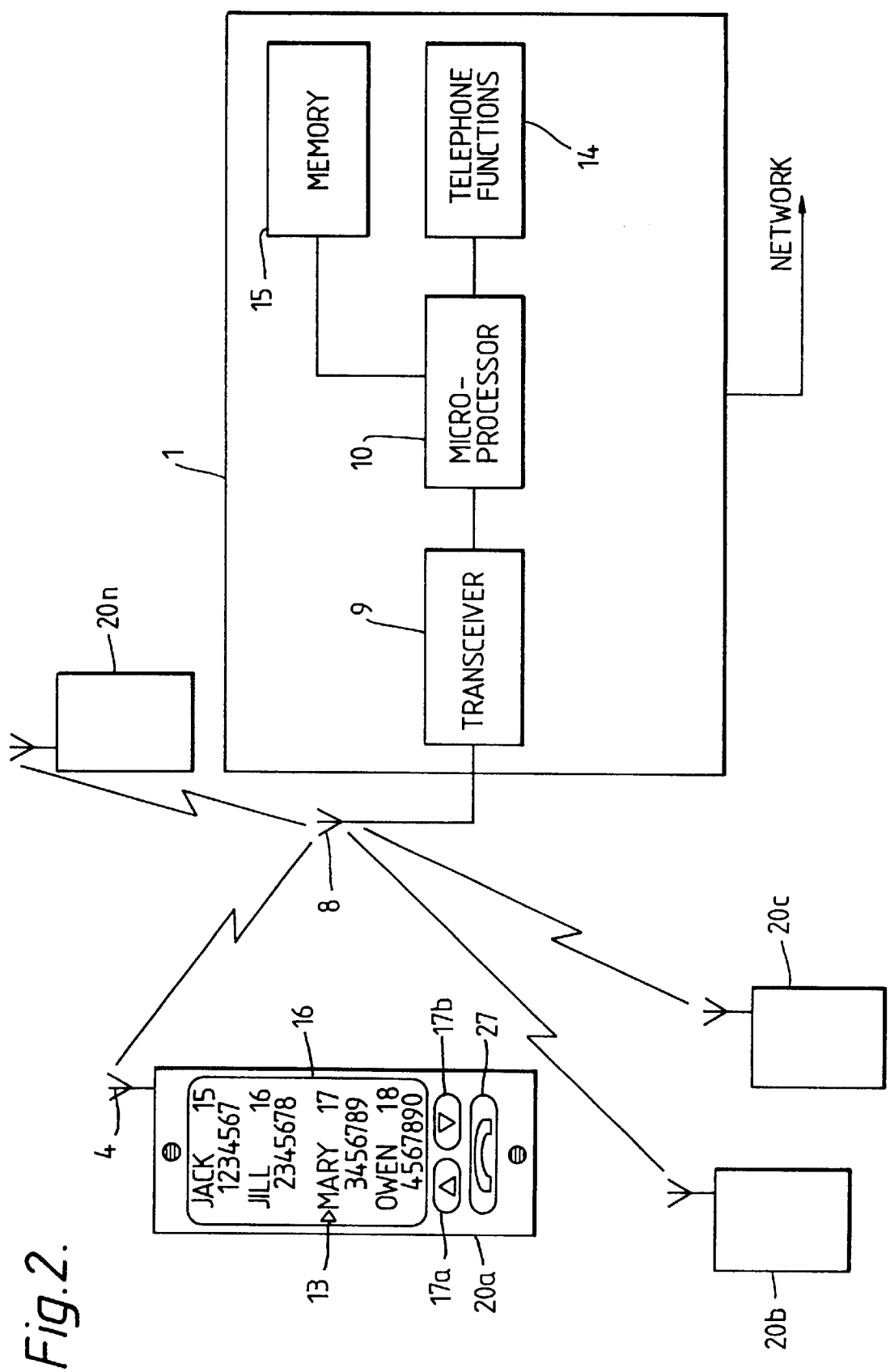

CORDLESS TELEPHONE ARRANGEMENT

"This is a continuation of application (s) Ser. No. 08/003,785 filed on Jan. 13, 1993, now abandoned."

"This is a continuation of application(s) Ser. No. 08/308,950 filed on Sep. 20, 1994, now abandoned."

This invention relates to a cordless telephone arrangement comprising a base station coupled to a telephone network, and a plurality of mobile stations capable of communicating selectively with other telephones on the network via a radio link with the base station.

BACKGROUND OF THE INVENTION

At the present time a variety of cordless telephone systems exist within Europe. For example some countries such as France and UK have adopted national specifications using low frequencies under 50 Mhz. An analogue system known as CT1 has been adopted by other countries. A digital system based on frequency division multiple access (FDMA) known as CT2, has been developed in the UK. In Sweden the CT3 system has been developed which is a time division multiple access (TDMA) digital system.

Additionally, the European Telecommunications Standards Institute (ETSI) has proposed a standard cordless system known as Digital European Cordless Telephone (DECT), which offers a quality of communications comparable with standard land-line telephones. The DECT concept is one of versatility of applications at a cost intended to encourage wide availability and market adoption. The DECT concept includes a definition of personal portable communications based on small, easy to use terminals. Thus DECT is intended to offer low-power cordless access between a portable terminal and the DECT infrastructure at ranges of up to several hundred metres from the base station.

Apart from the residential application which would interconnect DECT to a PSTN with the features and responses of a standard fixed-wire telephone, a DECT Business Cordless Telecommunications system (BCT) is envisaged that combines the features of a private branch exchange (PBX) with the mobility of cordless telecommunications for both voice and non-voice applications.

A common feature of the known cordless systems mentioned above is that in each case the mobile station, ie the telephone itself, conventionally comprises a user-interface including a display and a keypad having a plurality of buttons or keys which can be depressed by the user in order to operate the telephone, ie to dial a telephone number or perform other functions such as for example to display a telephone number or other data stored in memory. Generally, the keypad comprises two main sets of keys, namely a first set of alphanumeric keys associated with alphanumeric data, including the digits 0–9 inclusive, particularly for dialing telephone numbers, but also (optionally) for entering alphanumeric data into the telephone memories, eg a subscriber number index; and a second set of function keys for enabling previous predetermined functions or operations. Included in the second set of function keys, for example, may be a special key for initiating and terminating a telephone call. Another of the function keys may be a menu key, actuation of which enables a variety of pre-set menus to be viewed and selectively enabled. A particular menu option may be selected using another key on the keypad.

Both displays and keypads have certainly gained universal acceptance in the cordless telephone industry and indeed there is a high level of commonality of the keypad for telephone applications generally. However, the size and volume of the keypad mechanism and associated electronics necessarily contribute to the overall size and weight of the telephone handset.

Also, the requirement for a keypad and, possibly a display, imposes significant ergonomic and aesthetic constraint on the overall design of a cordless telephone handset.

In the context of mobile telephones for use inside vehicles, where safety considerations are important, but the weight and volume of the overall apparatus are less critical than for portable telephones, it is known to provide a voice recognition facility whereby numbers may be dialed in response to commands uttered by the user without the need for manual dialing. This function is commonly known as voice-activated dialing. It is noted that in known arrangements the voice recognition facility is provided within the terminal apparatus and the dialing operation is performed locally by the mobile telephone apparatus itself. Conventionally, the voice-activated dialing function is provided as an adjunct to the manual dialing facility and hence the telephone is generally also provided with a standard keypad. A mobile telephone with voice-activated dialing is disclosed, for example, in U.S. Pat. No. 5,042,063.

SUMMARY OF THE INVENTION

According to the present invention there is provided a cordless telephone arrangement comprising a base station coupled to a telephone network, and a plurality of mobile stations capable of communicating with other telephones on the telephone network via a radio link with said base station, wherein the base station is adapted to dial a telephone number automatically for a mobile station in response to an instruction received by radio communication from the respective mobile station whereby the mobile station may selectively address other telephones on the network.

In accordance with the invention dialing is performed remotely by the base station on behalf of the individual mobile stations in response to an instruction sent by radio communication from the mobile station to the base station. The instruction may be given orally to the mobile station, that is to say the user may simply speak the telephone number to be dialed. Alternatively, the user may be presented with a predetermined list of telephone numbers, eg shown on a display on the mobile station, from which the number to be called may be selected eg with the aid of a movable cursor.

A cordless telephone arrangement in accordance with the present invention thus has the advantage that a telephone number is dialed remotely without the need to enter the number onto a keyboard at the mobile station. Indeed in a preferred embodiment the mobile station may comprise no independent means for dialing a telephone number. Specifically the mobile station need not include a keyboard. This enables the mobile station to be more compact and lightweight and permits much greater freedom in designing the mobile station.

In the case where the telephone number is dialed by voice command from the mobile station there is also no need for the mobile station to include a visual display, thereby further enlarging the scope for design freedom.

In a particular embodiment the mobile station further comprises means including, for example a button actuable by the user, for initiating a signal to be transmitted to the base station indicating a request to open communication. Thus the user is required merely to press a single button to signal to the base station that the dialing facility is required.

Suitably the base station may return a message by radio communication to the mobile station which has requested communication acknowledging receipt of the request, and inviting the user to select a service from a predetermined set of available services. The predetermined set of services may include, for example, remote dialing, re-directing an incoming call, storing or retrieving a number in or from a memory etc.

In one embodiment the base station includes voice synthesizing means for conveying a spoken message to the mobile station. Alternatively the different services available may be indicated on visual display means on the mobile station, and a particular service may be selected e.g. with the aid of a movable cursor.

Preferably the base station is adapted additionally to provide automatically for a mobile station a service other than dialing a telephone number in response to an instruction received by radio communication from the respective mobile station. The services provided remotely at the base station may for example include call re-direction, and/or storing or retrieving a number in or from a central memory in the base station.

Specifically the mobile station may take the form of a portable handset and the base station may take the form of a private branch exchange (PBX), for example in the context of a DECT BCT.

BRIEF DESCRIPTION OF THE DRAWINGS

Embodiments of the invention will now be described, by way of example, with reference to the accompanying drawings in which:

FIG. 2 is a schematic block diagram of a different cordless telephone arrangement in accordance with the invention.

DETAILED DESCRIPTION OF THE INVENTION

Figure 1:
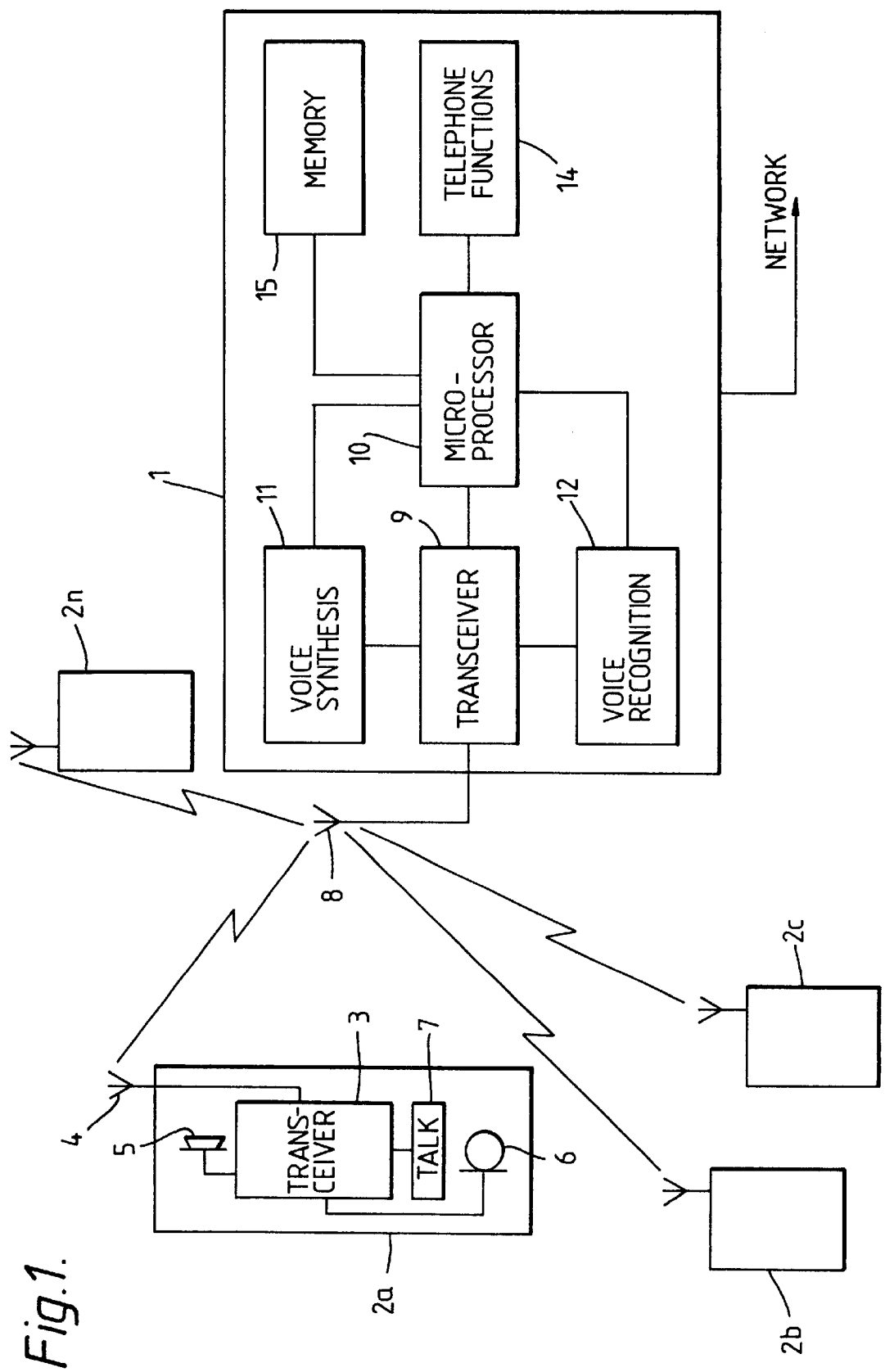
FIG. 1 is a schematic block diagram of a cordless telephone arrangement in accordance with the preset invention, comprising a base station and a plurality of mobile stations.

The cordless telephone arrangement shown in FIG. 1 comprises a base station 1 connected to the conventional telephone network and a plurality of mobile stations 2a,2b, 2c . . . 2n in radio communication with base station 1. In the context of a DECT Business Cordless Telecommunications (BCT) system the base station 1 is in the form of a private branch exchange (PBX) and the mobile stations are in the form of portable handset extensions.

As shown in FIG. 1 in relation to handset 2a, each handset 2a . . 2n comprises a radio transceiver 3 coupled to an antenna 4. A conventional speaker 5 and microphone 6 coupled to the transceiver 3 are present respectively at the earpiece and the mouthpiece of the handset. The handset 2a also comprises a button or key 7 present externally on the handset housing for imitating a signal to indicate that the user wishes to make (or receive a call). The button 7 may be labelled with a legend such as "TALK" or "CALL", or with a symbol (or icon) such as a bow-shaped conventional telephone handset ☏. When the "TALK" button 7 is pressed the transceiver 3 is activated and a signal is generated under microprocessor control for indicating to the PBX 1 that the mobile station 2a is requesting that a communication link is opened. The request signal is radiated by antenna 4 on the handset 2a and received by antenna 8 on PBX 1 when the handset 2a is within range of the PBX 1. At the PBX 1 the antenna 8 is coupled to a transceiver 9 which is in turn coupled to a microprocessor 10. When the microprocessor 10 detects that the PBX 1 has received a communication request from a specific handset 2a, the PBX will respond to the respective handset in accordance with a predetermined hand-shake protocol. Specifically, the PBX will establish a communications link with the particular handset on a unique channel allocation. None of the other handsets 2b . . . 2n will be capable of communicating with the base station on the same channel for the duration of the allocation to the particular handset 2a. The PBX 1 responds under control of the microprocessor by sending a message back to the handset acknowledging receipt of the communication request. More particularly the PBX may include a voice synthesizer 11 for generating a spoken message which may also invite the user of handset 2 to select a particular service. For example, immediately after the communication link is established between the handset 2a and the PBX 1 the voice synthesizer may generate a message such as "What service do you require?" which is conveyed by radio communication back to the handset 3 where it is conveyed to the user through the speaker 5. The user may then issue a spoken instruction or command from a predetermined set of word instructions. The uttered command is conveyed by radio from handset 2a to the PBX 1 where a voice recognition device 12 is capable of recognising and distinguishing the predetermined set of instructions. It is noted here that devices for recognizing uttered word commands are known in the art and in this regard reference is invited, for example, to PCT patent application WO 91/13431 and U.S. Pat. No. 5,042,063. In response to various word commands detected by the voice recognition device 13 and under control of the microprocessor 10 a variety of telephone functions 14 may be selectively enabled locally with the PBX 1 on behalf of the handset 2a.

For example, in response to the message "What service do you require" heard at the handset 2a, the user may reply: "STORE". The voice synthesizer 11 in the PBX 11 may return the message "What number?" and the user may then speak the telephone number he wishes to store, eg "One, Two, Three, Four, Five, Six, Seven". To indicate the end of the entry the user may add, for example the word "STOP" or "END". Having detected the end of the first entry the voice synthesizer 11 in PABX will generate a further message, such as "What name?", in reply to which the user may speak a name which he wishes to be associated with the number to be stored. Additionally or alternatively, the voice synthesizer may return the message "Which location?", giving the user the option to store the number at a particular memory location. If, on the other hand, he usually simply replies "END" or "STOP" or does not give any instruction within a predetermined time limit the information received by the PBX 1 will be stored into the next available memory location of that portion of the memory 15 present in the PBX 1 specifically assigned to the handset 2a. Thus the telephone number spoken by the user will be stored together with the associated name either at the chosen memory location or at the next available memory location in the remote memory 15. once the information entered by the user has been stored in the memory 15, the voice synthesizer 11 may return a message to the handset 2a confirming that the requested service has been performed as requested and enquiring whether another service is required.

Now, assuming the user wishes to make an outgoing telephone call, he may initiate the remote dialing function within the PBX 1 by speaking the instruction "CALL" or "DIAL". He may then continue by speaking each of the digits of the telephone number to be dialed. As each digit is recognised by the voice recognition device 12 in the PBX 1 the number is dialed by the dialing facility encompassed within the general telephone functions unit 14 under control of the microprocessor 10 whereby the handset 2a may be used to selectively address any other telephone on the network. Rather than speaking the whole telephone number, if the user knows that the number is already stored in the PBX memory 15, he may simply speak either (a) the associated name stored in conjunction with the desired number, or (b) the memory location of the desired number. Thus each of the following oral commands: "Call One, Two, Three, Four, Five, Six, Seven, End" "Call Jack, End" "Call location One, Five, End" spoken into the handset 2a would have the same effect of causing the PBX 1 to remotely dial the telephone number 1234567 on behalf of the handset, assuming that the number 1234567 is stored with the name "Jack" at memory location 15 in the portion of the PBX memory 15 assigned to the handset 2a. It will be understood that the memory 15 may also have portions associated respectively with each of the other handsets 2b,2c. . . 2n, and thus constituting a remote telephone directory for each handset.

Before the dialing operation is commenced by the telephone function block 14, the voice synthesizer may return a message to the handset stating the information received, and requesting confirmation, for example in the following format: "The number you have requested is One, Two, Three, Four, Five, Six, Seven. Is this correct?" If the user replies "YES" the dialing operation will proceed. If the user replies "NO" the voice synthesizer may return a prompt such as "Please repeat the telephone number you require". After the user has repeated the number the PBX will again seek confirmation before commencing the dialing operation.

Once the dialing instruction has been acted upon by the PBX 1 a telephone call is able to proceed between the handset 2a and another telephone on the network having the number which was dialed.

Thus the handset 2a may be used for making calls to any desired telephone number although the handset itself does not include a conventional keyboard, nor indeed any independent means for dialing telephone numbers. On the contrary, the handset 2a (and each of the other handsets 2c, 2b. . . 2n) comprise only a single, user actuable button 7, since all of the functions required for use by the telephone are available remotely at the PBX 1 and can be actuated by spoken command from the handset 2a.

A call which is in progress may be terminated simply by depressing the TALK button 7. The radio transmitter in handset 2a will thereby be disabled.

Moreover, an incoming call may be directed to the respective handset by the PBX in conventional manner. The call may be received simply by pressing the TALK button 7. However, it is preferable that on actuation of the TALK button 7 the call is not connected immediately, but that first an announcement of the call is made. Particularly if the incoming call includes a Calling Line Identification (CLI) signal identifying the caller the voice synthesizer 11 in the PBX 1 may generate an announcement under control of the microprocessor 10, for example in the following format "Incoming call from 1234567. Do you wish to take the call?". If the user replies "YES" the call will be connected, but if the answer is "NO" the PBX will respond with a query such as "Do you wish to transfer the call?". If the answer is "NO" the incoming call will be left ringing and unanswered. On the other hand, if the answer is "YES" the PBX 1 will ask "Transfer the call to which number". The user may then simply speak the telephone number to which he intends the incoming call to be redirected. The voice recognition device 12 will respond to the spoken number and cause the incoming call to be redirected by the telephone function facility 14 under the control of the microprocessor 10.

FIG. 2 shows a modified embodiment of a cordless telephone arrangement in which in addition to a talk button 27 the individual handsets 20a. . . 20n additionally comprise a visual display 16 and a pair of scroll buttons 17a, 17b. Scroll button 17a bears an upwardly pointing arrow symbol and scroll button 17b bears a downwardly pointing arrow symbol. In this embodiment the PBX 1 does not include a voice synthesizer or a voice recognition unit. Hence the PBX 1 is neither capable of generating voice messages or of understanding spoken commands.

In this case messages are conveyed by radio communication from the PBX 1 to the handset 20a and displayed in menu format on the visual display 16. A cursor 13 on the display can be moved to point to a particular option by depressing the UP and DOWN keys 17a, 17b respectively. The desired option can then be selected by depressing the TALK ✆. button 27 when the cursor is pointing at the appropriate option.

Thus for example when the user wishes to make a call he presses button 27. The hand-shake protocol is entered to establish communication between the handset 20a and the PBX 1 as described above. The PBX 1 then returns a message by radio communication to the handset 20a which causes the display 16 to show what options are available eg 1. MAKE CALL; 2. TRANSFER NO.; 3. RETRIEVE NO. The user may point to the chosen option using scroll keys 17a, 17b, and confirm the selection by depressing key 27. If the user selects MAKE CALL the PBX 1 may return a further message causing the display 16 to show a list of all the names and/or telephone numbers and/or locations stored in the associated memory portion of the PBX memory 15. The user may point to the chosen number using the scroll keys 17a, 17b and confirm the selection by depressing key 27.

It will be evident that various means may be shown on handset display 16 in response to messages received from PBX 1 at different stages during the making and reception of outgoing and incoming telephone calls and during the performance of other telephone services. Also, when a menu option is chosen and confirmed by actuation of the handset key 27 an appropriate instruction will be generated by the handset under control of a local microprocessor and relayed by radio communication to the PBX 1 which will respond accordingly and remotely perform the requested service on behalf of the handset 20a in a manner analogous to that described in connection with the first embodiment.

In view of the foregoing description it will be evident to a person skilled in the art that various modifications may be made within the scope of the present invention. For example the instructions carried out by the PBX from the handset may be a combination of spoken commands and menu selected options. Furthermore the PBX may be adapted to perform remotely on behalf of the handset services other than those specifically mentioned herein.

What is claimed is:

1. A cordless telephone arrangement comprising a base station coupled to a telephone network, and a plurality of mobile stations capable of communicating selectively with other telephones on the network via a two-way radio link with the base station; wherein a mobile station comprises means for issuing an instruction by radio communication requesting the base station to dial a desired telephone number without the mobile station transmitting the desired telephone number to the base station with the instruction; and the base station comprises:
   means for receiving the instruction for the mobile station, and
   means responsive to said receiving means receiving the instruction for determining the desired telephone number based upon the instruction and dialing the desired telephone number to establish communication between the respective mobile station and the telephone on the network having the desired telephone number.

2. A cordless telephone arrangement as claimed in claim 1, wherein the mobile station comprises no independent means for dialing a telephone number.

3. A cordless telephone arrangement as claimed in claim 1, wherein the base station is adapted to dial a telephone number automatically for a mobile station in response to an instruction uttered to the respective mobile station and received at the base station by radio communication therefrom.

4. A cordless telephone arrangement as claimed in claim 1, wherein the mobile station further includes means for initiating a signal for transmission to the base station indicating a request to open communication therewith.

5. A cordless telephone arrangement as claimed in claim 4, wherein the signal initiating means include a button actuable by the user.

6. A cordless telephone arrangement as claimed in claim 4, wherein the base station is adapted to send a message by radio communication to the mobile station which has requested communication inviting the user to select a service from a predetermined set of services available.

7. A cordless telephone arrangement as claimed in claim 6, wherein the base station includes voice synthesizing means for conveying a spoken message to the mobile station.

8. A cordless telephone arrangement as claimed in claim 6, wherein the mobile station includes visual display means adapted to indicate the predetermined set of services available, and means for selecting one of the services indicated on the display.

9. A cordless telephone arrangement as claimed in claim 1, wherein the base station is adapted additionally to provide automatically for a mobile station a service other than dialing a telephone number in response to an instruction received by radio communication from the respective mobile station.

10. A cordless telephone arrangement as claimed in claim 1, wherein the mobile station is in the form of a portable handset.

11. A cordless telephone arrangement as claimed in claim 1, wherein the base station is in the form of a private branch exchange (PBX).

12. A cordless telephone arrangement comprising a base station coupled to a telephone network, and mobile stations capable of communicating selectively with other telephones connected to the network via a radio link of the mobile stations with the base station;

wherein the base station includes means for receiving a dialing instruction by radio communication from at least one of the mobile stations, means for dialing a telephone number on the telephone network based upon the dialing instruction received from the at least one mobile station, and means for transmitting an operating instruction to the at least one mobile station; and wherein the at least one mobile station includes means for issuing the dialing instruction by radio communication requesting the base station to dial a telephone number, and means for receiving the operating instruction by radio communication from the base station, wherein the dialing instruction does not contain the desired telephone number and the base station comprises means for determining the desired telephone number based upon the instruction.

13. A cordless telephone arrangement comprising a base station coupled to a telephone network, and a plurality of mobile stations capable of communicating selectively with other telephones on the network via a two-way radio link of the mobile stations with the base station; wherein at least one of the mobile stations comprises means for issuing an instruction by radio communication requesting the base station to dial a desired telephone number without the instruction containing the desired telephone number; and the base station comprises:
   means for receiving the instruction from the mobile station; and
   means responsive to said receiving means for dialling the desired telephone number to establish communication between the respective mobile station and the telephone on the network having the desired telephone number, the base station being adapted to simultaneously communicate with individual mobile stations on separate channels.

14. A telephone arrangement as in claim 12 wherein the at least one mobile station comprises no independent means for dialing a telephone number.

15. A telephone arrangement as in claim 13 wherein the at least one mobile station comprises no independent means for dialing a telephone number.

* * * * *